US010146315B2

(12) United States Patent
Yliaho et al.

(10) Patent No.: US 10,146,315 B2
(45) Date of Patent: Dec. 4, 2018

(54) TACTILE APPARATUS LINK

(71) Applicant: Nokia Technologies Oy, Espoo (FI)

(72) Inventors: Marko Tapani Yliaho, Tampere (FI); Thorsten Behles, Kangasala (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/888,460

(22) Filed: Feb. 5, 2018

(65) Prior Publication Data

US 2018/0157326 A1 Jun. 7, 2018

Related U.S. Application Data

(63) Continuation of application No. 14/383,559, filed as application No. PCT/IB2012/051243 on Mar. 15, 2012, now Pat. No. 9,886,091.

(51) Int. Cl.
| | |
|---|---|
| *G06F 3/01* | (2006.01) |
| *G06F 3/041* | (2006.01) |
| *G06F 3/0488* | (2013.01) |

(52) U.S. Cl.
CPC ............ *G06F 3/016* (2013.01); *G06F 3/0414* (2013.01); *G06F 3/0488* (2013.01); *G06F 3/04883* (2013.01); *H04M 2250/22* (2013.01)

(58) Field of Classification Search
None
See application file for complete search history.

(56) References Cited

U.S. PATENT DOCUMENTS

| | | |
|---|---|---|
| 6,359,550 B1 | 3/2002 | Brisebois et al. |
| 2004/0125120 A1 | 7/2004 | Weiner |
| 2006/0279548 A1 | 12/2006 | Geaghan |
| 2009/0146963 A1 | 6/2009 | Yeh et al. |
| 2011/0001707 A1 | 1/2011 | Faubert |
| 2011/0191680 A1 | 8/2011 | Chae |

FOREIGN PATENT DOCUMENTS

| | | |
|---|---|---|
| EP | 0875821 | 11/1998 |
| GB | 2416962 | 2/2006 |
| WO | 2011064432 | 6/2011 |

*Primary Examiner* — Gustavo Polo
(74) *Attorney, Agent, or Firm* — Harrington & Smith

(57) ABSTRACT

An apparatus comprising: an input module configured to determine an input characteristic; a signal generator configured to generate a signal dependent on the input characteristic; and an output module configured to provide the signal to one or more separate apparatus, wherein the signal is configured to generate a tactile output.

18 Claims, 13 Drawing Sheets

TACTILE APPARATUS LINK

CROSS REFERENCE TO RELATED APPLICATION

This is a continuation patent application of U.S. patent application Ser. No. 14/383,559 filed on Sep. 7, 2014, which is a national stage application of PCT Application No. PCT/IB2012/051243 filed Mar. 15, 2012, which are both hereby incorporated by reference in their entireties.

FIELD

The present invention relates to providing tactile functionality. The invention further relates to, but is not limited to, display apparatus providing tactile and speaker functionality for use in mobile devices.

BACKGROUND

Many portable devices, for example mobile telephones, are equipped with a display such as a glass or plastic display window for providing information to the user. Furthermore such display windows are now commonly used as touch sensitive inputs. The use of a touch sensitive input with the display has the advantage over a mechanical keypad in that the display may be configured to show a range of different inputs depending on the operating mode of the device. For example, in a first mode of operation the display may be enabled to enter a phone number by displaying a simple numeric keypad arrangement and in a second mode the display may be enabled for text input by displaying an alphanumeric display configuration such as a simulated Qwerty keyboard display arrangement.

Furthermore such devices typically also use electro-acoustic transducers to produce audio for earpiece and speaker operations as well as for alert tones. The moving coil dynamic speaker configuration used is typically relatively large in relation to the volume within the device and require specific signal processing considerations in order that the acoustic frequency response is acceptable. Furthermore moving coil transducers can attract contaminants such as small iron particles from within the internal volume of the device and also through ports provided to enable acoustic wave transmission from the speaker to the external environment. These contaminants can cause distortion and faults within the speakers significantly reducing the lifetime of the device.

STATEMENT

According to an aspect, there is provided a method for a communications system comprising: determining an input characteristic; generating a signal dependent on the input characteristic; and providing the signal to one or more separate apparatus, wherein the signal is configured to generate a tactile output in a suitable apparatus.

Determining an input characteristic may comprise: determining a touch input; determining a characteristic of the touch input; and generating a signal dependent on the characteristic, wherein the signal is configured to generate a tactile output.

Determining a characteristic of the touch input may comprise: determining a force/pressure of the touch input; determining a displacement of the touch input in a first direction relative to an edge of the touch input apparatus; determining a displacement of the touch input in a second direction substantially orthogonal to the first direction; determining a speed of the touch input; determining a co-ordinate of the touch input; determining a number of points of contact of the touch input; and determining a gesture from the touch input.

Determining a gesture from the touch input may comprise determining at least one of: determining a swipe gesture; determining a pinch zoom gesture; determining a shape gesture; and determining a circular/arc gesture.

Generating the signal dependent on the input characteristic may comprise at least one of: determining a signal waveform dependent on the input characteristic; determining a signal frequency dependent on the input characteristic; determining a signal amplitude dependent on the input characteristic; determining a modulation of a defined signal dependent on the input characteristic; and determining a signal pulse width dependent on the input characteristic.

The method may further comprise: determining at least one further input from a separate apparatus; determining a further input characteristic; and generating the signal dependent on the further input characteristic.

The method may further comprise determining a difference between the input characteristic and the further input characteristic, wherein generating the signal dependent on the further input characteristic may comprise determining the signal dependent on the difference between the input characteristic and the further input characteristic.

The method may further comprise: generating an audio signal; and mixing the signal and the audio signal to form a combined signal.

The method may further comprise at least one of: storing the signal; and transmitting the signal.

Transmitting the signal may comprise at least one of: transmitting the signal as a component of a mixed signal, with at least one audio signal; transmitting the signal as an email; transmitting the signal as a MMS message; transmitting the signal as metadata accompanying an audio signal; and transmitting the signal as a first channel signal accompanying a second channel audio signal.

Determining an input characteristic may comprise at least one of: determining a status of the vibra component; determining a vibra component parameter; determining a proximity detector parameter; determining an ambient light sensor parameter; determining a magnetometer parameter; determining an accelerometer parameter; determining a GPS parameter; determining a status of the receiver; determining a status of a transmitter; determining a radio frequency receiver parameter; and determining a radio frequency transmitter parameter.

Generating a signal dependent on the input characteristic may comprise selecting one from a list of defined signals.

Generating a signal dependent on the input characteristic may further comprise embedding within the signal an indicator that the signal is configured to generate a tactile output in a suitable apparatus.

The indicator may be an audio watermark.

Providing the signal to one or more separate apparatus may comprise at least one of: providing the signal via a telephony coupling; providing the signal via a voice over Internet protocol network; providing the signal via a server; providing the signal via a network; providing the signal via a multimedia message service message; and providing the signal via an email.

According to a second aspect there is provided a method comprising: receiving a signal dependent on an input characteristic from a separate apparatus; and generating a tactile output dependent on the signal.

Receiving the signal may comprise: receiving the signal from a memory; and receiving the signal from a further apparatus.

Generating the tactile output dependent on the signal may comprise outputting the combined signal to an audio display module, wherein the audio display module may be configured to transduce the signal component to generate the tactile output.

The signal may be a component of a combined signal mixed with an audio signal and the method may further comprise the audio display module configured to transduce the audio signal to generate an audio output.

The signal may comprise at least one of: an indicator for a vibra signal; a vibra signal frequency; a vibra signal amplitude; a vibra signal waveform definition; a vibra signal waveform definition indicator; and at least one sine wave signal.

The method may further comprise generating a visual output dependent on the signal.

Receiving the signal dependent on an input characteristic from a separate apparatus may comprise at least one of: receiving the signal via a telephony coupling; receiving the signal via a voice over Internet protocol network; receiving the signal via a server; receiving the signal via a network; receiving the signal via a multimedia message service message; and receiving the signal via an email.

The tactile output may comprise at least one of: an audio signal; an haptic feedback; a vibra signal; an audio/haptic signal; a visual signal; an audio/visual data signal; a haptic/visual data signal; and an audio/visual/haptic signal.

According to a third aspect there is provided apparatus comprising at least one processor and at least one memory including computer code for one or more programs, the at least one memory and the computer code configured to with the at least one processor cause the apparatus to at least perform: determining an input characteristic; generating a signal dependent on the input characteristic; and providing the signal to one or more separate apparatus, wherein the signal is configured to generate a tactile output.

Determining an input characteristic may cause the apparatus to perform: determining a touch input; determining a characteristic of the touch input; and generating a signal dependent on the characteristic, wherein the signal is configured to generate a tactile output.

The determining a characteristic of the touch input causes the apparatus to perform: determining a force/pressure of the touch input; determining a displacement of the touch input in a first direction relative to an edge of the touch input apparatus; determining a displacement of the touch input in a second direction substantially orthogonal to the first direction; determining a speed of the touch input; determining a co-ordinate of the touch input; determining a number of points of contact of the touch input; and determining a gesture from the touch input.

Determining a gesture from the touch input may cause the apparatus to perform determining at least one of: determining a swipe gesture; determining a pinch zoom gesture; determining a shape gesture; and determining a circular/arc gesture.

Generating the signal dependent on the input characteristic may cause the apparatus to perform at least one of: determining a signal waveform dependent on the input characteristic; determining a signal frequency dependent on the input characteristic; determining a signal amplitude dependent on the input characteristic; determining a modulation of a defined signal dependent on the input characteristic; and determining a signal pulse width dependent on the input characteristic.

The apparatus may further perform: determining at least one further input from a separate apparatus; determining a further input characteristic; and generating the signal dependent on the further input characteristic.

The apparatus may further perform determining a difference between the input characteristic and the further input characteristic, wherein generating the signal dependent on the further input characteristic causes the apparatus to perform determining the signal dependent on the difference between the input characteristic and the further input characteristic.

The apparatus may be further caused to perform: generating an audio signal; and mixing the signal and the audio signal to form a combined signal.

The apparatus may further perform at least one of: storing the signal; and transmitting the signal.

Transmitting the signal may cause the apparatus to perform at least one of: transmitting the signal as a component of a mixed signal, with at least one audio signal; transmitting the signal as an email; transmitting the signal as a MMS message; transmitting the signal as metadata accompanying an audio signal; and transmitting the signal as a first channel signal accompanying a second channel audio signal.

Determining an input characteristic may cause the apparatus to perform at least one of: determining a status of the vibra component; determining a vibra component parameter; determining a proximity detector parameter; determining an ambient light sensor parameter; determining a magnetometer parameter; determining an accelerometer parameter; determining a GPS parameter; determining a status of the receiver; determining a status of a transmitter; determining a radio frequency receiver parameter; and determining a radio frequency transmitter parameter.

Generating a signal dependent on the input characteristic may cause the apparatus to perform selecting one from a list of defined signals.

Generating a signal dependent on the input characteristic may cause the apparatus to perform embedding within the signal an indicator that the signal is configured to generate a tactile output in a suitable apparatus.

The indicator may be an audio watermark.

Providing the signal to one or more separate apparatus may cause the apparatus to perform at least one of: providing the signal via a telephony coupling; providing the signal via a voice over internet protocol network; providing the signal via a server; providing the signal via a network; providing the signal via a multimedia message service message; and providing the signal via an email.

According to fourth aspect there is provided an apparatus comprising at least one processor and at least one memory including computer code for one or more programs, the at least one memory and the computer code configured to with the at least one processor cause the apparatus to at least perform: receiving a signal dependent on an input characteristic from a separate apparatus; and generating a tactile output dependent on the signal.

Receiving the signal may cause the apparatus to perform: receiving the signal from memory; and receiving the signal from a further apparatus.

Generating the tactile output dependent on the signal may cause the apparatus to perform outputting the combined signal to an audio display module, wherein the audio display module may be configured to transduce the signal component to generate the tactile output.

The signal may be a component of a combined signal mixed with an audio signal and the apparatus may be further caused to perform controlling the audio display module to generate an audio output.

The signal may comprise at least one of: an indicator for a vibra signal; a vibra signal frequency; a vibra signal amplitude; a vibra signal waveform definition; vibra signal waveform definition indicator; and at least one sine wave signal.

The apparatus may be caused to perform generating a visual output dependent on the signal.

Receiving the signal dependent on an input characteristic from a separate apparatus may cause the apparatus to perform at least one of: receiving the signal via a telephony coupling; receiving the signal via a voice over internet protocol network; receiving the signal via a server; receiving the signal via a network; receiving the signal via a multimedia message service message; and receiving the signal via an email.

The tactile output may comprise at least one of: an audio signal; an haptic feedback; a vibra signal; an audio/haptic signal; a visual signal; an audio/visual data signal; a haptic/visual data signal; and an audio/visual/haptic signal.

According to fifth aspect there is provided an apparatus comprising: means for determining an input characteristic; means for generating a signal dependent on the input characteristic; and means for providing the signal to one or more separate apparatus, wherein the signal is configured to generate a tactile output.

The means for determining an input characteristic may comprise: means for determining a touch input; means for determining a characteristic of the touch input; and means for generating a signal dependent on the characteristic, wherein the signal is configured to generate a tactile output.

The means for determining a characteristic of the touch input may comprise: means for determining a force/pressure of the touch input; means for determining a displacement of the touch input in a first direction relative to an edge of the touch input apparatus; means for determining a displacement of the touch input in a second direction substantially orthogonal to the first direction; means for determining a speed of the touch input; means for determining a co-ordinate of the touch input; means for determining a number of points of contact of the touch input; and means for determining a gesture from the touch input.

The means for determining a gesture from the touch input may comprise at least one of: means for determining a swipe gesture; means for determining a pinch zoom gesture; means for determining a shape gesture; and means for determining a circular/arc gesture.

The means for generating the signal dependent on the input characteristic may comprise at least one of: means for determining a signal waveform dependent on the input characteristic; means for determining a signal frequency dependent on the input characteristic; means for determining a signal amplitude dependent on the input characteristic; means for determining a modulation of a defined signal dependent on the input characteristic; and means for determining a signal pulse width dependent on the input characteristic.

The apparatus may further comprise: means for determining at least one further input from a separate apparatus; means for determining a further input characteristic; and means for generating the signal dependent on the further input characteristic.

The apparatus may comprise means for determining a difference between the input characteristic and the further input characteristic, wherein the means for generating the signal dependent on the further input characteristic comprise means for determining the signal dependent on the difference between the input characteristic and the further input characteristic.

The apparatus may further comprise: means for generating an audio signal; and means for mixing the signal and the audio signal to form a combined signal.

The apparatus may comprise at least one of: means for storing the signal; and means for transmitting the signal.

The means for transmitting the signal may comprise at least one of: means for transmitting the signal as a component of a mixed signal, with at least one audio signal; means for transmitting the signal as an email; means for transmitting the signal as a MMS message; means for transmitting the signal as metadata accompanying an audio signal; and means for transmitting the signal as a first channel signal accompanying a second channel audio signal.

The means for determining an input characteristic may comprise at least one of: means for determining a status of the vibra component; means for determining a vibra component parameter; means for determining a proximity detector parameter; means for determining an ambient light sensor parameter; means for determining a magnetometer parameter; means for determining an accelerometer parameter; means for determining a GPS parameter; means for determining a status of the receiver; means for determining a status of a transmitter; means for determining a radio frequency receiver parameter; and means for determining a radio frequency transmitter parameter.

The means for generating a signal dependent on the input characteristic may comprise means for selecting one from a list of defined signals.

The means for generating a signal dependent on the input characteristic may comprise means for embedding within the signal an indicator that the signal is configured to generate a tactile output in a suitable apparatus.

The indicator may be an audio watermark.

The means for providing the signal to one or more separate apparatus may comprise at least one of: means for providing the signal via a telephony coupling; means for providing the signal via a voice over Internet protocol network; means for providing the signal via a server; means for providing the signal via a network; means for providing the signal via a multimedia message service message; and means for providing the signal via an email.

According to a sixth aspect there is provided an apparatus comprising: means for receiving a signal dependent on an input characteristic from a separate apparatus; and means for generating a tactile output dependent on the signal.

The means for receiving the signal may comprise at least one of: means for receiving the signal from memory; and means for receiving the signal from a further apparatus.

The means for generating the tactile output dependent on the signal may comprise means for outputting the combined signal to an audio display module, wherein the audio display module is configured to transduce the signal component to generate the tactile output.

The signal may be a component of a combined signal mixed with an audio signal and the apparatus may comprise means for controlling the audio display module to generate an audio output.

The signal may comprise at least one of: an indicator for a vibra signal; a vibra signal frequency; a vibra signal amplitude; a vibra signal waveform definition; vibra signal waveform definition indicator; and at least one sine wave signal.

The apparatus may comprise means for generating a visual output dependent on the signal.

The means for receiving the signal dependent on an input characteristic from a separate apparatus may comprise at least one of: means for receiving the signal via a telephony coupling; means for receiving the signal via a voice over internet protocol network; means for receiving the signal via a server; means for receiving the signal via a network; means for receiving the signal via a multimedia message service message; and means for receiving the signal via an email.

The tactile output may comprise at least one of: an audio signal; an haptic feedback; a vibra signal; an audio/haptic signal; a visual signal; an audio/visual data signal; a haptic/visual data signal; and an audio/visual/haptic signal.

According to a seventh aspect there is provided an apparatus comprising: an input module configured to determine an input characteristic; a signal generator configured to generate a signal dependent on the input characteristic; and an output module configured to provide the signal to one or more separate apparatus, wherein the signal is configured to generate a tactile output.

The input module may comprise: a touch input module configured to determine a touch input; a touch characteristic determiner configured to determine a characteristic of the touch input; and the signal generator is configured to generate a signal dependent on the characteristic, wherein the signal is configured to generate a tactile output.

The touch characteristic determiner may be configured to determine at least one of: a force/pressure of the touch input; a displacement of the touch input in a first direction relative to an edge of the touch input apparatus; a displacement of the touch input in a second direction substantially orthogonal to the first direction; a speed of the touch input; a co-ordinate of the touch input; a number of points of contact of the touch input; and a gesture from the touch input.

The gesture from the touch input may comprise at least one of: a swipe gesture; a pinch zoom gesture; a shape gesture; and a circular/arc gesture.

The signal generator may be configured to generate at least one of: a signal waveform dependent on the input characteristic; a signal frequency dependent on the input characteristic; a signal amplitude dependent on the input characteristic; a modulation of a defined signal dependent on the input characteristic; and a signal pulse width dependent on the input characteristic.

The apparatus may further comprise: a further input configured to determine at least one further input from a separate apparatus; a further input characteristic determiner configured to determine a further input characteristic; wherein the signal generator is configured to generate the signal dependent on the further input characteristic.

The apparatus may comprise an input characteristic difference determiner configured to determine a difference between the input characteristic and the further input characteristic, wherein the signal generator is configured to generate the signal dependent on the difference between the input characteristic and the further input characteristic.

The apparatus may further comprise: an audio signal source configured to generate an audio signal; and a mixer configured to mix the signal and the audio signal to form a combined signal.

The apparatus may comprise at least one of: a memory configured to store the signal; and a transmitter configured to transmit the signal.

The transmitter may be configured to transmit the signal as at least one of: a component of a mixed signal, with at least one audio signal; an email; a MMS message; metadata accompanying an audio signal; and a first channel signal accompanying a second channel audio signal.

The input module may be configured to receive at least one of: a status of the vibra component; a vibra component parameter; a proximity detector parameter; an ambient light sensor parameter; a magnetometer parameter; an accelerometer parameter; a GPS parameter; a status of the receiver; a status of a transmitter; a radio frequency receiver parameter; and a radio frequency transmitter parameter.

The signal generator may be configured to select one from a list of defined signals.

The signal generator may be configured to embed within the signal an indicator that the signal is configured to generate a tactile output in a suitable apparatus.

The indicator may be an audio watermark.

The output module may be configured to at least one of: provide the signal via a telephony coupling; provide the signal via a voice over internet protocol network; provide the signal via a server; provide the signal via a network; provide the signal via a multimedia message service message; and provide the signal via an email.

According to an eighth aspect there is provided an apparatus comprising: a decoder configured to generate a signal dependent on a received input characteristic from a separate apparatus; and an audio driver configured to generate a tactile output dependent on the signal.

The apparatus may comprise at least one of: a memory configured to store the signal; and a receiver configured to receive the signal from a further apparatus.

The decoder may be configured to output the combined signal to an audio display module, wherein the audio display module may be configured to transduce the signal component to generate the tactile output.

The signal may be a component of a combined signal mixed with an audio signal and the apparatus comprises an audio driver configured to control the audio display module to generate an audio output.

The signal may comprise at least one of: an indicator for a vibra signal; a vibra signal frequency; a vibra signal amplitude; a vibra signal waveform definition; vibra signal waveform definition indicator; and at least one sine wave signal.

The apparatus may comprise a display for generating a visual output dependent on the signal.

The decoder may be configured to: receive the signal via a telephony coupling; receive the signal via a voice over Internet protocol network; receive the signal via a server; receive the signal via a network; receive the signal via a multimedia message service message; and receive the signal via an email.

The tactile output may comprise at least one of: an audio signal; an haptic feedback; a vibra signal; an audio/haptic signal; a visual signal; an audio/visual data signal; a haptic/visual data signal; and an audio/visual/haptic signal.

A computer program product may be stored on a medium for causing an apparatus to perform the method as described herein.

An electronic device may comprise apparatus as described herein.

A chipset may comprise apparatus as described herein.

SUMMARY OF FIGURES

For better understanding of the present invention, reference will now be made by way of example to the accompanying drawings in which.

DESCRIPTION OF EXAMPLE EMBODIMENTS

The application describes apparatus and methods capable of generating, encoding, storing, transmitting and outputting tactile and acoustic outputs from a touch screen device.

Figure 1:
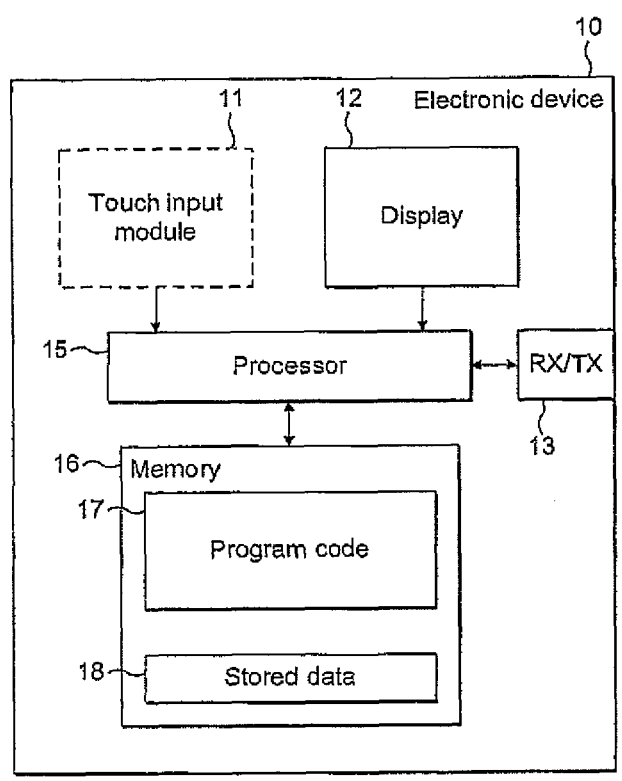
FIG. 1 shows schematically an apparatus suitable for employing some embodiments.

With respect to FIG. 1 a schematic block diagram of an example electronic device 10 or apparatus on which embodiments of the application can be implemented. The apparatus 10 is such embodiments configured to provide improved tactile and acoustic wave generation.

The apparatus 10 is in some embodiments a mobile terminal, mobile phone or user equipment for operation in a wireless communication system. In other embodiments, the apparatus is any suitable electronic device configured to provide an image display, such as for example a digital camera, a portable audio player (mp3 player), a portable video player (mp4 player). In other embodiments the apparatus can be any suitable electronic device with touch interface (which may or may not display information) such as a touch-screen or touch-pad configured to provide feedback when the touch-screen or touch-pad is touched. For example in some embodiments the touch-pad can be a touch-sensitive keypad which can in some embodiments have no markings on it and in other embodiments have physical markings or designations on the front window. An example of such a touch sensor can be a touch sensitive user interface to replace keypads in automatic teller machines (ATM) that does not require a screen mounted underneath the front window projecting a display. The user can in such embodiments be notified of where to touch by a physical identifier—such as a raised profile, or a printed layer which can be illuminated by a light guide.

The apparatus 10 comprises a touch input module or user interface 11, which is linked to a processor 15. The processor 15 is further linked to a display 12. The processor 15 is further linked to a transceiver (TX/RX) 13 and to a memory 16.

In some embodiments, the touch input module 11 and/or the display 12 are separate or separable from the electronic device and the processor receives signals from the touch input module 11 and/or transmits and signals to the display 12 via the transceiver 13 or another suitable interface. Furthermore in some embodiments the touch input module 11 and display 12 are parts of the same component. In such embodiments the touch interface module 11 and display 12 can be referred to as the display part or touch display part.

The processor 15 can in some embodiments be configured to execute various program codes. The implemented program codes, in some embodiments can comprise such routines as touch capture digital processing or configuration code where the touch input module inputs are detected and processed, pseudo-audio signal generation and processing where electrical signals are generated which when passed to a transducer can generate tactile or haptic feedback to the user of the apparatus, or actuator processing configured to generate an actuator signal for driving an actuator. The implemented program codes can in some embodiments be stored for example in the memory 16 and specifically within a program code section 17 of the memory 16 for retrieval by the processor 15 whenever needed. The memory 15 in some embodiments can further provide a section 18 for storing data, for example data that has been processed in accordance with the application, for example pseudo-audio signal data.

The touch input module 11 can in some embodiments implement any suitable touch screen interface technology. For example in some embodiments the touch screen interface can comprise a capacitive sensor configured to be sensitive to the presence of a finger above or on the touch screen interface. The capacitive sensor can comprise an insulator (for example glass or plastic), coated with a transparent conductor (for example indium tin oxide—ITO). As the human body is also a conductor, touching the surface of the screen results in a distortion of the local electrostatic field, measurable as a change in capacitance. Any suitable technology may be used to determine the location of the touch. The location can be passed to the processor which may calculate how the user's touch relates to the device. The insulator protects the conductive layer from dirt, dust or residue from the finger.

In some other embodiments the touch input module can be a resistive sensor comprising of several layers of which two are thin, metallic, electrically conductive layers separated by a narrow gap. When an object, such as a finger, presses down on a point on the panel's outer surface the two metallic layers become connected at that point: the panel then behaves as a pair of voltage dividers with connected outputs. This physical change therefore causes a change in the electrical current which is registered as a touch event and sent to the processor for processing.

In some other embodiments the touch input module can further determine a touch using technologies such as visual detection for example a camera either located below the surface or over the surface detecting the position of the finger or touching object, projected capacitance detection, infra-red detection, surface acoustic wave detection, dispersive signal technology, and acoustic pulse recognition. In some embodiments it would be understood that 'touch' can be defined by both physical contact and 'hover touch' where there is no physical contact with the sensor but the object located in close proximity with the sensor has an effect on the sensor.

The apparatus 10 can in some embodiments be capable of implementing the processing techniques at least partially in hardware, in other words the processing carried out by the processor 15 may be implemented at least partially in hardware without the need of software or firmware to operate the hardware.

The transceiver 13 in some embodiments enables communication with other electronic devices, for example in some embodiments via a wireless communication network.

The display 12 may comprise any suitable display technology. For example the display element can be located below the touch input module and project an image through the touch input module to be viewed by the user. The display 12 can employ any suitable display technology such as liquid crystal display (LCD), light emitting diodes (LED), organic light emitting diodes (OLED), plasma display cells, Field emission display (FED), surface-conduction electron-emitter displays (SED), and Electophoretic displays (also known as electronic paper, e-paper or electronic ink displays). In some embodiments the display 12 employs one of the display technologies projected using a light guide to the display window. As described herein the display 12 in some embodiments can be implemented as a physical fixed display. For example the display can be a physical decal or transfer on the front window. In some other embodiments the display can be located on a physically different level from the rest of the surface, such a raised or recessed marking on the front window. In some other embodiments the display can be a printed layer illuminated by a light guide under the front window.

In some embodiments, the apparatus comprises an orientation sensor. The orientation sensor can be any suitable orientation sensor. The orientation sensor can in some embodiments be part of a position sensor configured to estimate the position of the apparatus. The position sensor can in some embodiments be a satellite positioning sensor such as GPS (Global Positioning System), GLONASS or Galileo receiver.

In some embodiments, the positioning sensor can be a cellular ID system or assisted GPS system.

In some embodiments, the orientation sensor can be any suitable orientation sensor. For example, in some embodiments the orientation sensor can be an electronic compass, an accelerometer, a gyroscope or be determined by the motion of the apparatus using the positioning estimate (in other words, dead reckoning).

Figure 2:
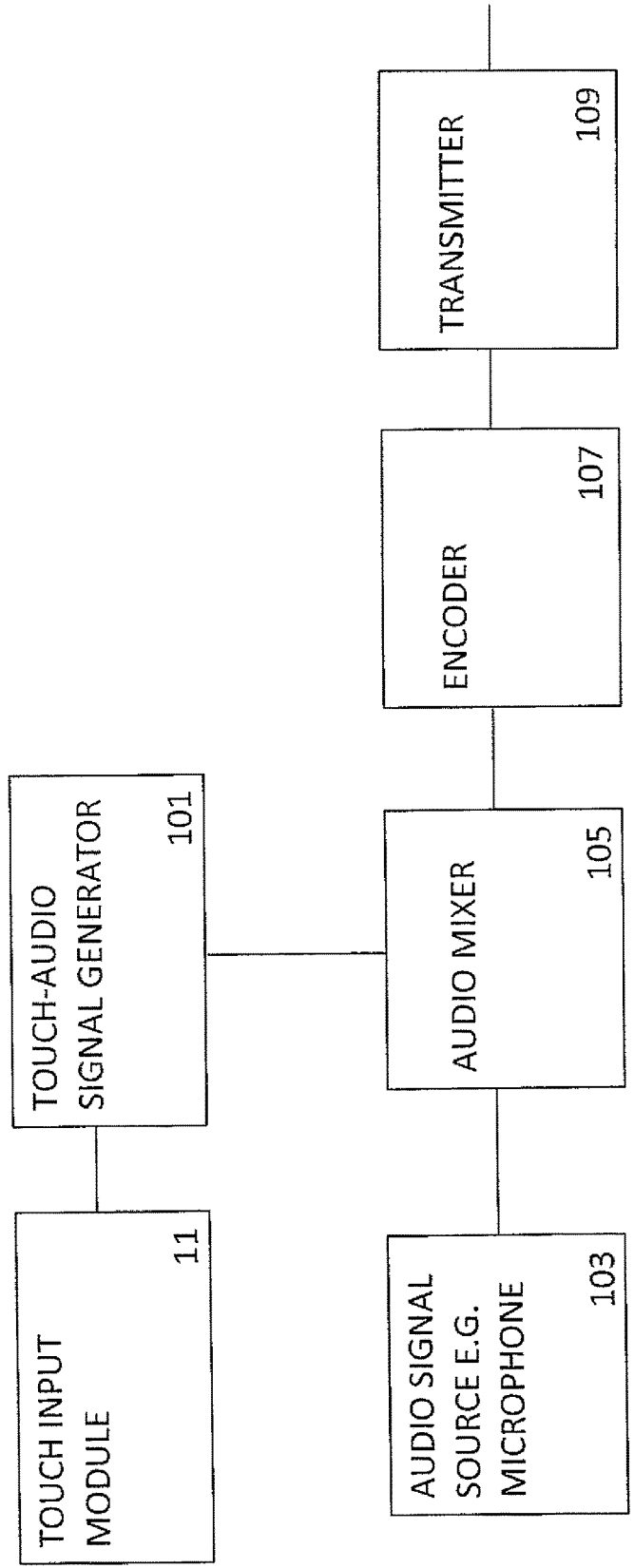
FIG. 2 shows schematically a tactile user input apparatus according to some embodiments.

With respect to FIG. 2 an example tactile user input apparatus according to some embodiments is shown. With respect to FIG. 3 a flow diagram showing the operation of the example tactile user input apparatus is shown. In some embodiments the tactile user input apparatus comprises the touch input module 11 configured to provide a suitable electrical signal representing the touch input. The touch input module is configured to pass the touch input signal to the touch audio signal generator 101.

Furthermore in some embodiments the tactile user input apparatus comprises an audio signal source 103. The audio signal source can be any suitable signal source. For example the audio signal can be a microphone input (recording a concert or a telephone conversation). The audio signal source 103 can be configured to output a generated electrical signal representing the audio signal to the audio mixer 105.

In some embodiments the tactile user input apparatus comprises a touch audio signal generator 101. The touch audio signal generator 101 is configured to receive the touch input signal from the touch input module 11.

Figure 3:
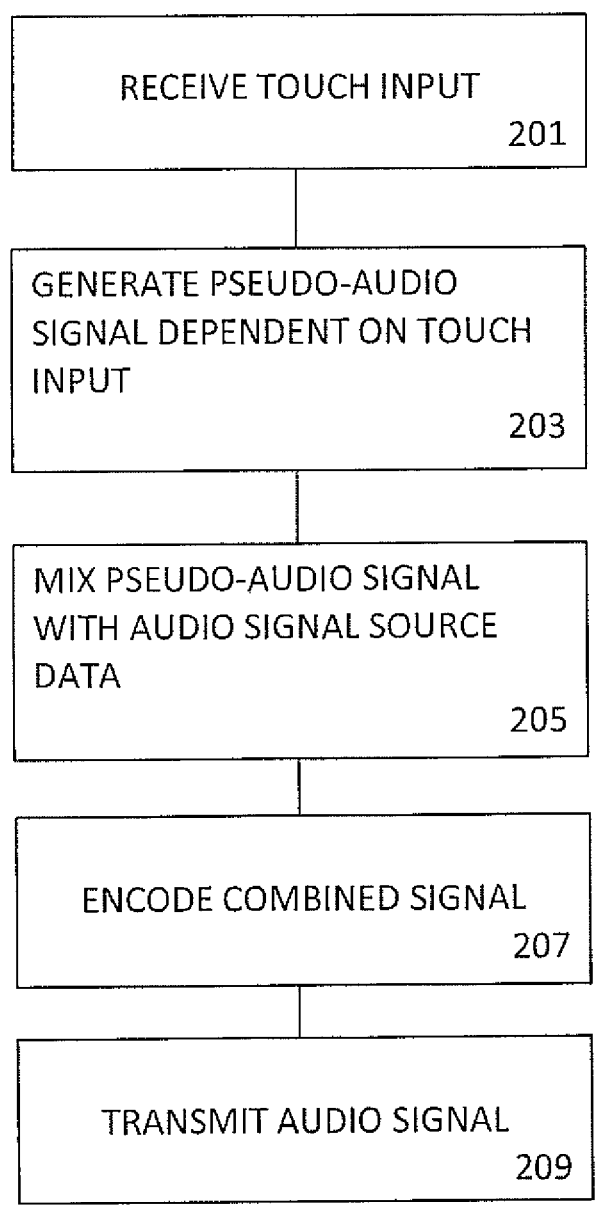
FIG. 3 shows a flow-diagram of the operation of the tactile user input apparatus as shown in FIG. 2 according to some embodiments.

The operation of receiving the touch input at the touch audio signal generator 101 is shown in FIG. 3 by step 201.

Furthermore in some embodiments the tactile user input apparatus is configured to generate a suitable electrical signal representing a 'pseudo-audio' signal which when passed to a tactile user output apparatus, such as an output apparatus featuring an audio display as described herein is able to reproduce a tactile output representing the touch input.

The operation of generating the pseudo-audio signal dependent on the touch input is shown in FIG. 3 by step 203.

The touch audio signal generator 101 can in some embodiments be configured to output the pseudo-audio signal to an audio mixer 105.

In some embodiments the tactile user input apparatus comprises an audio mixer 105. The audio mixer 105 is configured to receive the audio signals from the audio signal source and the pseudo-audio signals from the touch audio signal generator 101 and mix these signals to form a combined audio signal. The combined audio signal can then be passed to an encoder 107. In some embodiments the audio mixer 105 can be configured to 'mix' or pass the pseudo-audio signals from the touch audio signal generator 101 where there is no active audio input. For example in some embodiments the user of the apparatus can be configured to generate, encode and transmit a tactile signal without any audio signal transmission as a purely pseudo-audio signal. In some embodiments the audio mixer 105 can be configured to receive more than one audio signal and/or more than one pseudo-audio signal and mix them into one suitable audio output signal. In some embodiments, for example, the more than one audio signal can be a mixing of two different audio sources (for example a microphone input with a stored audio source). In some embodiments the more than one pseudo-audio signal can also be received from more than one tactile source. For example in some embodiments the apparatus can comprise more than one screen, each of which is coupled to the touch audio signal generator 101 configured to generate two channels of 'pseudo-audio' signals, each channel associated with a display tactile input. Similarly the microphone or audio source can be a more than one channel, such as a stereo or array microphone arrangement configured to generate a multichannel audio signal. The multichannel audio signals can then in such embodiments be mixed with the multichannel tactile pseudo-audio signals to generate multichannel combined signals to be encoded, transmitted, received and output in a manner similar to that described herein.

In some embodiments the audio mixer 105 is configured to pass the received audio and pseudo-audio signals to be transmitted and/or stored as separate channels. For example in some embodiments where the signals are transmitted over a VoIP network, metadata can be sent alongside the phone calf audio signal. The metadata can for example be associated with the tactile or pseudo-audio signals. In some embodiments the tactile information may be transmitted over a separate channel than the audio signal. For example in some embodiments the tactile information may be passed to other apparatus via a MMS, email or other message type. In some embodiments therefore the generation and processing of the touch or tactile pseudo-audio signals is performed using a dedicated pseudo-audio signal pathway.

The operation of mixing the pseudo-audio signal with the audio signal source data to create a combined audio signal is shown in FIG. 3 by step 205.

In some embodiments the tactile user input apparatus comprises an encoder 107. The encoder can be any suitable encoder, for example a suitable wireless communications or data storage audio signal encoder.

The encoder can be configured in some embodiments the output the encoded signal to a transmitter. In some embodiments the output of the encoder 107 can be stored in memory for later transmission or reconstruction on the same device at a later time. It would be understood that in some embodiments no encoding is performed and the output is a plain pulse coded modulation (PCM) or similar audio signal. In such embodiments at least the pseudo-audio signal is passed to the transmitter for transmission/memory for storage.

The operation of encoding the combined signal is shown in FIG. 3 by step 207. In some embodiments the tactile user input apparatus comprises a transmitter 109. The transmitter can be any suitable transmitter means configured to output the encoded audio signal to a further apparatus. For example in some embodiments the transmitter can be configured to communicate over a circuit switched (CS) network such as for example a cellular network and/or a packet switched (PS) network such as for example a Wi-Fi (IEEE 802.11) network.

The operation of transmitting the audio signal is shown in FIG. 3 by step 209.

Figure 4:
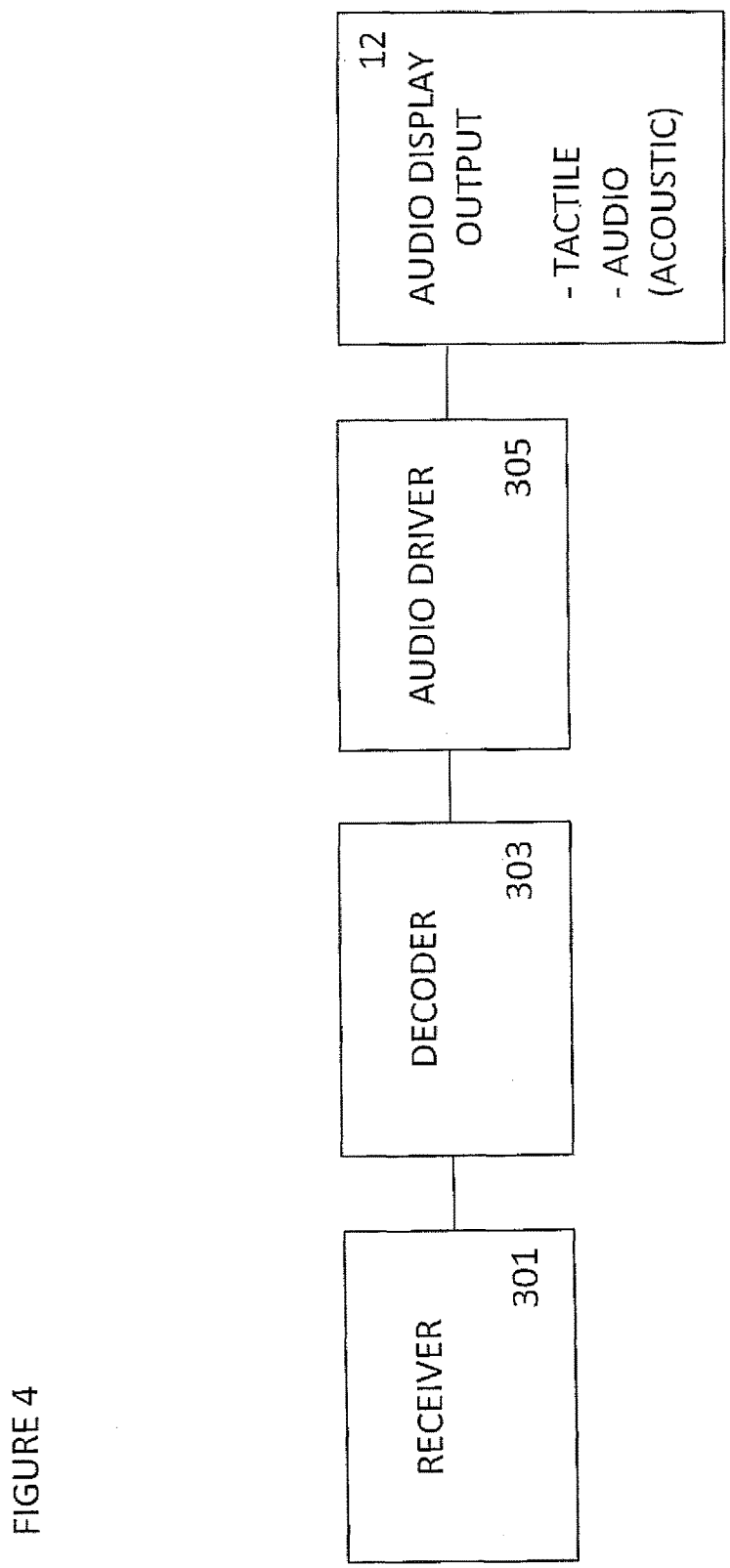
FIG. 4 shows schematically a tactile user output apparatus according to some embodiments.

With respect to FIG. 4 an example of a tactile user output apparatus according to some embodiments is shown. Furthermore with respect to FIG. 5 the operation of the tactile user output apparatus as shown in FIG. 4 is shown.

In some embodiments the tactile user output apparatus comprises a receiver 301. The receiver 301 is configured to receive the transmitted encoded combined audio signal. The receiver 301 can be any suitable receiver such as for example a wireless communications receiver or suitable receiver means.

In some embodiments the output of the receiver 301 can be passed to the decoder 303.

Figure 5:
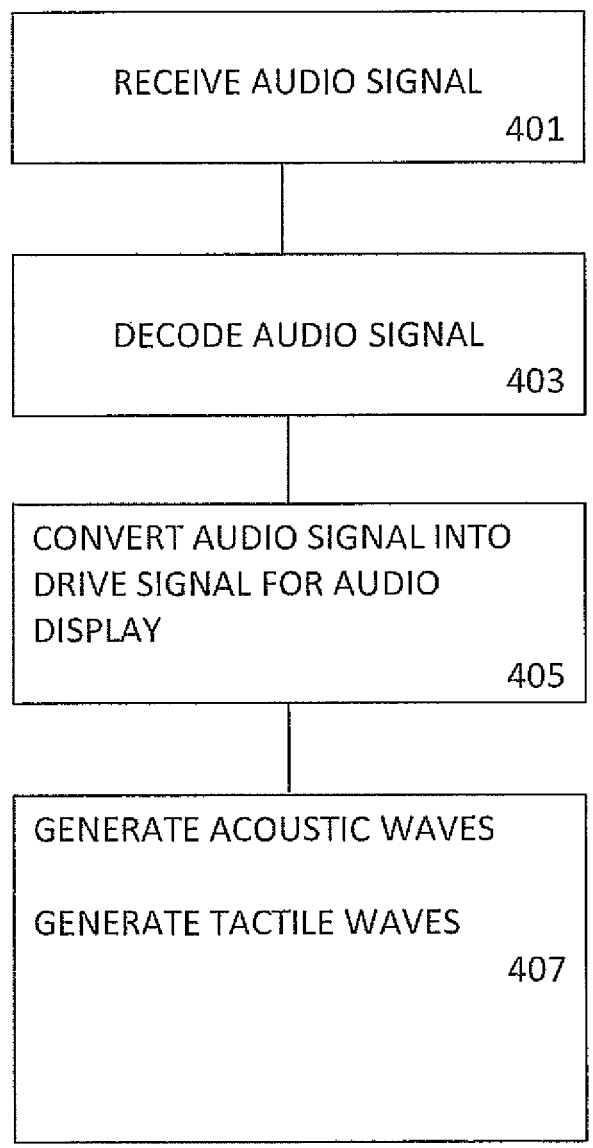
FIG. 5 shows a flow-diagram of the operation of the tactile user output apparatus as shown in FIG. 4 according to some embodiments.

The operation of receiving the audio signal is shown in FIG. 5 by step 401.

The tactile user output apparatus in some embodiments comprises a decoder 303. The decoder 303 is configured to receive the received encoded combined audio signal from the receiver 301 and decode the audio signal using a suitable decoding process (being the opposite to the encoding process used in the encoder 107 of the tactile user input apparatus as shown in FIG. 2).

The decoder 303 can be any suitable decoder or decoding means.

The operation of decoding the audio signal is shown in FIG. 5 by step 403.

The decoder in some embodiments can pass the decoded combined audio signal to an audio driver 305.

In some embodiments the tactile user output apparatus comprises an audio driver 305 configured to receive the decoded combined audio signal. The audio driver 305 is configured to process the combined audio signal in such a way that it drives the audio transducers coupled to the display.

The operation of converting the audio signal into a drive signal for the audio display is shown in FIG. 5 by step 405.

In some embodiments the tactile user output apparatus comprises the audio display 12. The audio display 12, can in some embodiments be the touch display as described herein configured to receive the combined audio signal drive signal and based on this signal to generate not only an acoustic waves (typically with a frequency greater than 300 Hz) but also is configured to generate tactile waves using the audio display (typically using audio signals below 300 Hz).

The operation of generating the acoustic waves by the audio display and the tactile waves by the audio display is shown in FIG. 5 by step 407.

The coupling or communications medium or network between the transmitter and receiver can be any suitable medium. As described herein the network could in some embodiments be any suitable circuit switched, packet switched or hybrid network. For example in some embodiments the transmitter and receiver are cellular or mobile network transmitter and receivers communicating over a circuit switched network. Similarly the transmitter and receiver are packet switched wireless communications network elements. In some embodiments the communication can be over Bluetooth or other suitable short distance wireless link.

Similarly in some embodiments the transmitter and receiver are wired network components, for example a circuit switched communications system such as the POTS circuit switched network, a packet switched network such as a voice over Internet protocol (VoIP) communications or any suitable combination or hybrid communications system.

In some embodiments the transmitter and receiver elements can be replaced by memory storage means. For example the encoded combined audio signal is stored on a memory which can in some embodiments be replaceable or fixed to the apparatus, and at a later time the encoded combined audio signal is played to produce an audio and tactile event. Thus in some embodiments while recording an audio event with the apparatus the user can tap the screen to create a physical reminder which can be output as a tactile output when the audio event is replayed.

In some embodiments the apparatus can be used during two party telephony, when the one party uses the touch screen the touch event is coded to the audio signal and mixed to the uplink signal of the phone call. The second party with the receiver, having a tactile audio display device, can feel the touch feedback on their device by holding their hand on the display. In such a way the transmitter can send a physical event to the receiver of the call.

In a first example a circuit switched phone call is established between two communications apparatus, the tactile user output apparatus and the tactile user input apparatus. The user of the tactile user input apparatus can touch the touch screen, the touch audio signal generator 101 generate a fixed frequency and fixed amplitude audio signal which is passed to the audio mixer 105 to be mixed with the uplink audio signal source signal. This is encoded and transmitted to the tactile user output apparatus which is then decoded and passed to the audio display which when held is able to transfer a touch event signal as the haptic feedback generated by the audio display.

In some embodiments the frequency of the touch event generates a 300 Hz audio signal or pseudo-audio signal and a fixed amplitude for example a 16 bit full scale sine wave audio signal to be mixed to the uplink signal.

It would be instead that in some embodiments a packet switched or voice over Internet protocol (VoIP) call can transmit the fixed frequency and fixed amplitude audio signal mixed to the uplink signal.

Although in the embodiments described above the communication occurs between two tactile audio display apparatus it would be understood that more than two tactile audio display apparatus can be used to implement a multiparty teleconference communication. In such embodiments a first communications apparatus can be configured to communicate to more than one further communications apparatus, each of the receiving apparatus being configured to regenerate the encoded combined audio signal which when output by the audio display on each receiving apparatus can be configured to provide both acoustic and tactile output. It would be understood that although the embodiments described herein discuss a transmission of speech/audio with tactile audio display embodiments that in some embodiments video calling and therefore audio video and tactile communication can be provided.

Furthermore in some embodiments the tactile user input apparatus can be used to communicate with a service provider or receive information from a service provider in the form of a purely tactile signal on the audio display. For example the service provider could be configured to provide audio signals to power the tactile audio display of the communications apparatus and so providing tactile information or feedback with or without audio feedback. In such embodiments the operator of the communications apparatus can hold their hand on the display and feel the touch event signal from the service. In some embodiments the user of the communications apparatus can then respond or request different types of signals using the DTMF tone dialing feature of the apparatus. The service in such embodiments detects the tones and performs the request, for example playing the requested signal.

In some embodiments the feedback may be requested by other suitable means other than DTMF. For example in some embodiments there could be a separate application the user of the apparatus can use to request tactile feedback, for example the application using some proprietary means.

Figure 6:
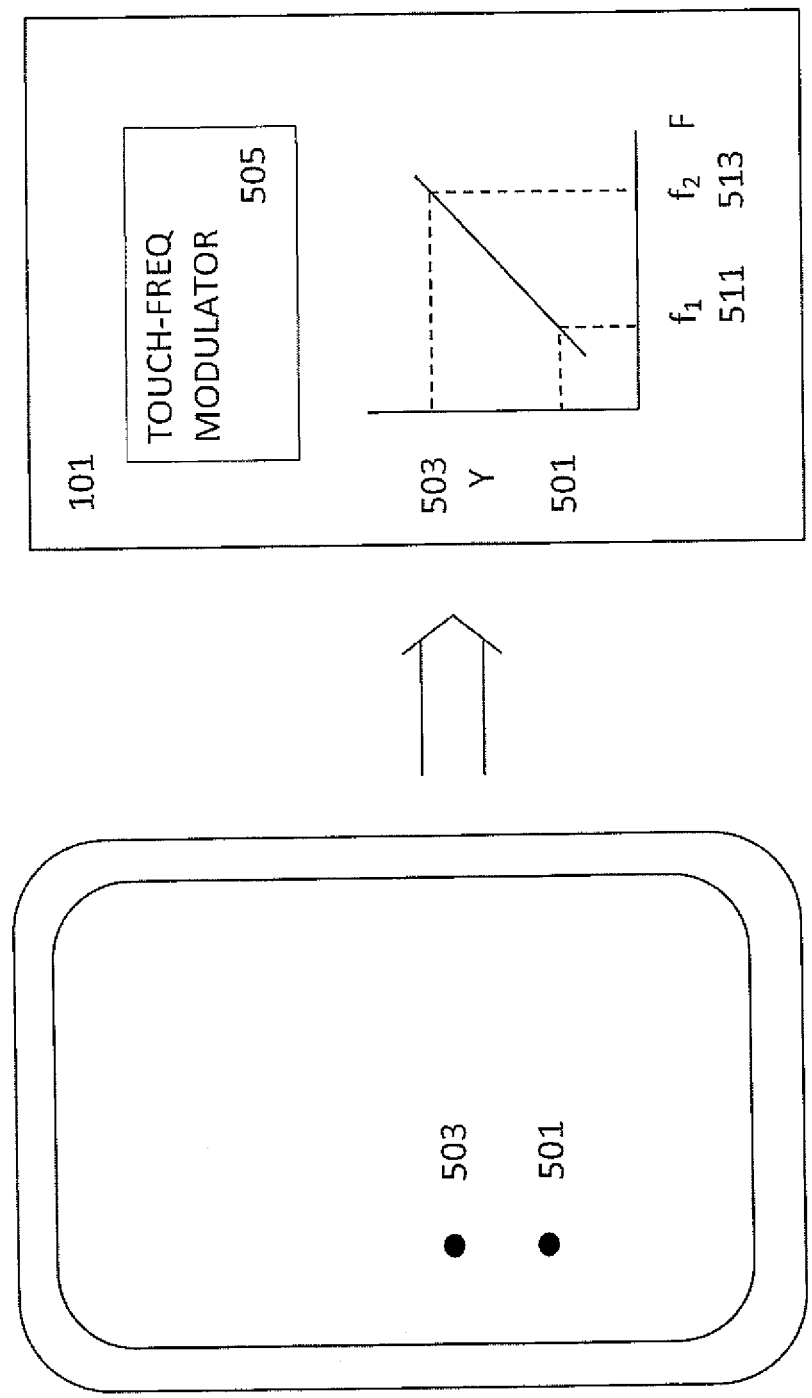
FIG. 6 shows schematically a touch-audio signal generator as shown in FIG. 2 according to some touch-frequency modulation embodiments.

With respect to FIG. 6 an example touch audio signal generator 101 is shown in further detail. The touch audio signal generator 101 as described herein is configured to enable haptic feedback generated by a user of the communications apparatus to generate a pseudo-audio signal and to be output by a suitable audio display as a regenerated tactile output.

In some embodiments the touch audio signal generator 101 comprises a touch frequency modulator 505. The operation of the touch audio signal generator touch frequency modulator 505 is shown in FIG. 7.

In such embodiments the touch frequency modulator 505 is configured to receive the touch signal from the touch input module 11 and generate a suitable pseudo-audio signal dependent on the touch location.

For example in some embodiments the touch frequency modulator 505 is configured to determine the touch location or multiple touch locations on the touch input module 11. In the following examples the touch location is determined with respect the location of the touch in the Y axis of the apparatus. However as described herein the touch frequency modulator 505 can in some embodiments be configured to modulate the pseudo-audio signal output dependent on X axis, touch pressure or force, number of touch points or any suitable combination of determinable input parameters or characteristics from the touch input module. The following examples show touch pseudo-audio modulators configured to generate a pseudo-audio signal dependent on a single touch input however it would be understood that any of the following examples can be implemented for multi-touch inputs.

Figure 7:
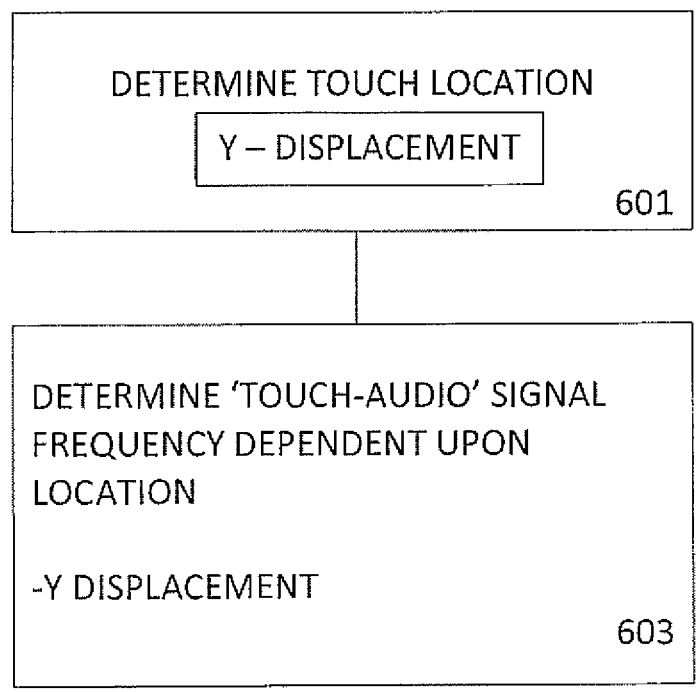
FIG. 7 shows a flow-diagram of the operation of the touch-audio signal generator as shown in FIG. 6 according to some embodiments.

The operation of determining the touch location, for example the Y axis displacement is shown in FIG. 7 by step 601.

The touch frequency modulator 505 can then be configured to determine or look up a suitable output pseudo-audio signal frequency dependent on the determined Y axis displacement of the touch point.

For example as shown in FIG. 6 the touch frequency modulator 505 has a linear relationship between the Y axis touch point displacement and the output frequency such that a first Y axis displacement 501 generates a first frequency $F_1$ 511 and a second Y displacement touch 503 generate a second frequency $F_2$ 513. In some embodiments of the first frequency $F_1$ can be 250 Hz and the second frequency $F_2$ 290 Hz. In other words as the touch event moves upwards on the device, (the Y axis touch point displacement increases) the frequency of the touch audio pseudo-audio signal increases.

The operation of determining a touch audio signal frequency dependent on the location is shown in FIG. 7 by step 603.

Although a linear relationship is shown between the Y axis touch point displacement and frequency any suitable relationship can be implemented in embodiments. For example the relationship could be non-linear, proportional or inversely proportional, monotonic or non-monotonic or any suitable mathematical relationship. In some embodiments a look up table rather than a mathematical determination can be implemented to determine the output with respect to the touch input characteristic.

Figure 8:
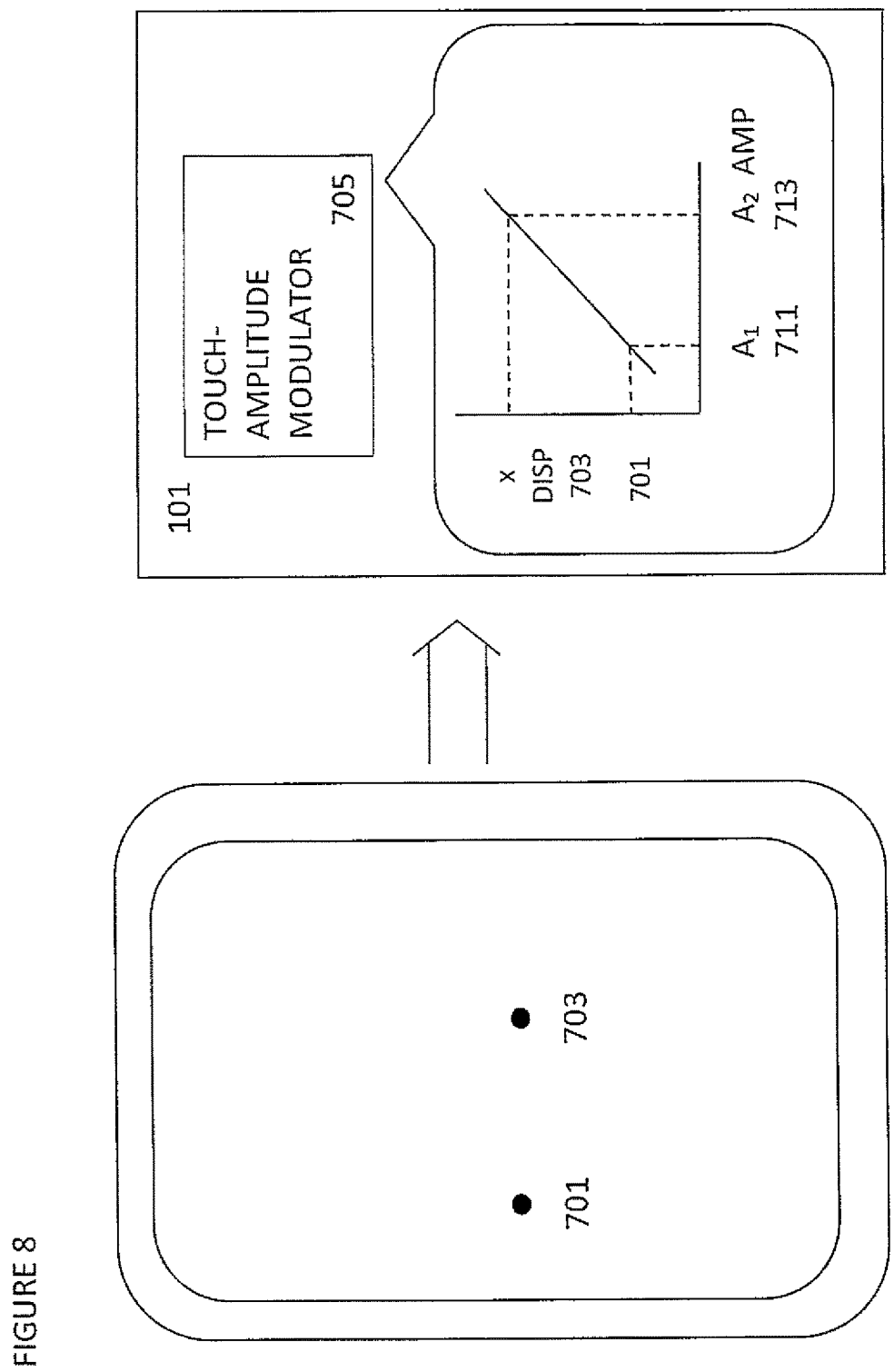
FIG. 8 shows schematically a touch-audio signal generator as shown in FIG. 2 according to some touch-amplitude modulation embodiments.

With respect to FIG. 8 an example touch audio signal generator 101 performing touch amplitude modulation is shown. Furthermore with respect to FIG. 9 the operation performing touch amplitude modulation in the touch audio signal generator 101 is shown.

In some embodiments the touch audio signal generator 101 comprises a touch amplitude modulator 705. The touch amplitude modulator 705 is configured to modulate the amplitude of the generated pseudo-audio signal to change the amplitude dependent on a characteristic or determined parameter of the touch input module signal. In the example shown in FIGS. 8 and 9 the amplitude of the pseudo-audio signal is dependent on the X axis touch point displacement. However it would be understood that in some other embodiments the amplitude modulation can be dependent on the Y axis touch point displacement, pressure or force of the touch input, number of touch points or any suitable combination or selection of parameters.

The touch amplitude modulator 705 is in some embodiments configured to determine the touch location with respect to the X axis of the display.

Figure 9:
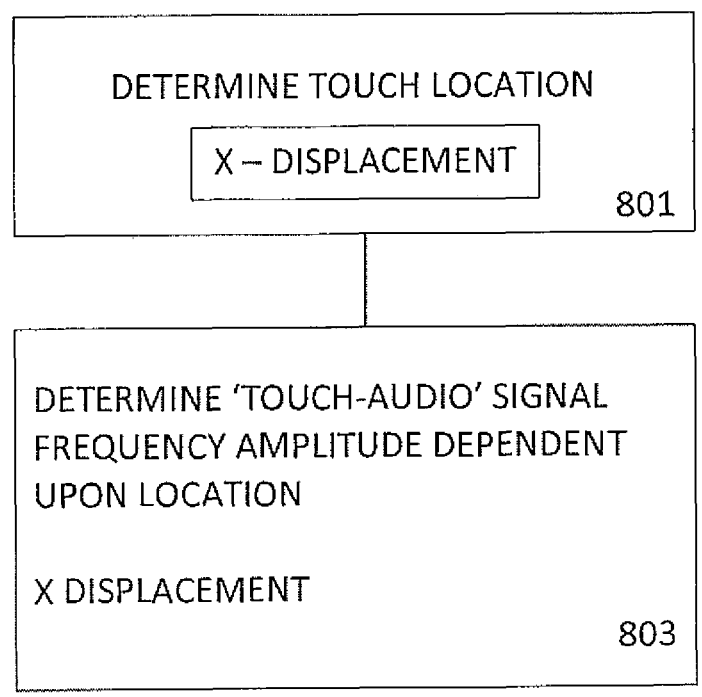
FIG. 9 shows a flow-diagram of the operation of the touch-audio signal generator as shown in FIG. 8 according to some embodiments.

The operation of determining the touch location X displacement is shown in FIG. 9 by step 801.

The touch amplitude modulator 705 then can be configured to determine a touch audio pseudo-audio signal amplitude dependent on the X axis touch point displacement. In the example shown in FIG. 8 the relationship between the X axis touch point displacement and the amplitude is a linear proportional relationship. The touch amplitude modulator 705 for example is configured to output a first amplitude $A_1$ 711 for a first X axis displacement touch input 701 and a second amplitude $A_2$ 713 for a second X axis displacement value 703. For example in the example shown in FIGS. 8 and 9 the first touch displacement point 701 can be configured to enable the touch amplitude modulator 705 to output a 16 bit half scale sine wave at 300 Hz whereas the second touch location 703 generates a full scale sine wave at 300 Hz.

However any suitable relationship can be implemented. For example the relationship could be non-linear, proportional or inversely proportional, monotonic or non-monotonic or any suitable mathematical relationship. In some embodiments a look up table rather than a mathematical determination can be implemented to determine the output with respect to the touch input characteristic.

Figure 10:
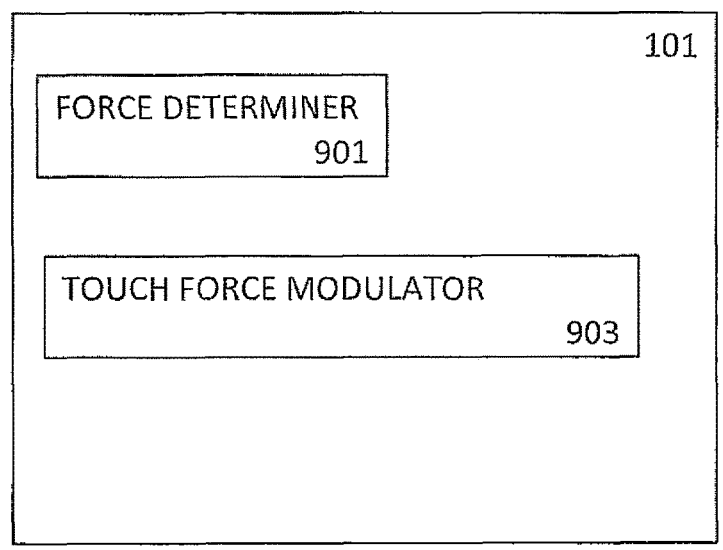
FIG. 10 shows schematically a touch-audio signal generator as shown in FIG. 2 according to some touch-pressure modulation embodiments.

With respect to FIG. 10 a touch audio signal generator comprising a touch force modulator is shown. Furthermore with respect to FIG. 11 the touch force modulator operations are shown in further detail.

In some embodiments the touch audio signal generator can be configured to detect the strength or force or pressure of the touch and modulate the tactile output dependent on the force or pressure.

In some embodiments the touch audio signal generator 101 comprises a force determiner 901. The force determiner 901 is configured to determine the touch pressure or force applied to the touch input module 11. The force determiner 901 is configured to output the determined force value to a touch force modulator 903.

Figure 11:
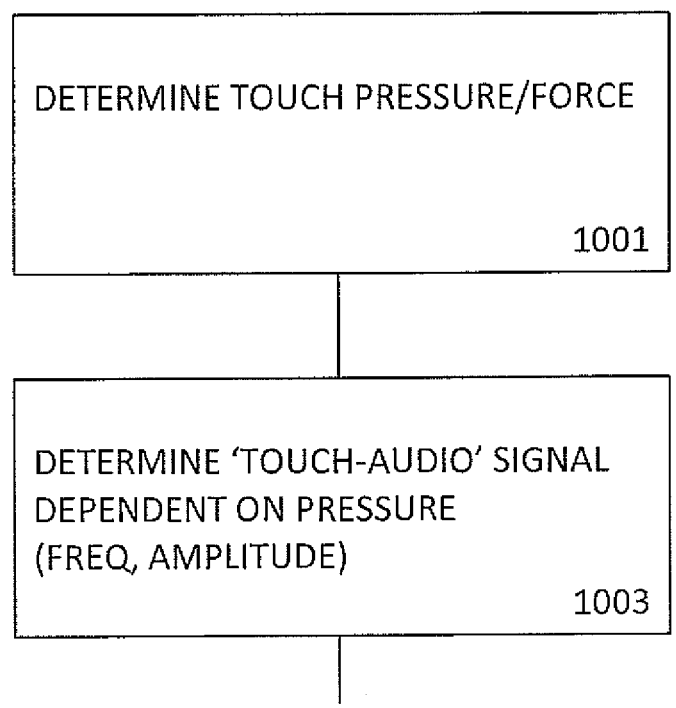
FIG. 11 shows a flow-diagram of the operation of the touch-audio signal generator as shown in FIG. 10 according to some embodiments.

The operation of determining the touch pressure or force is shown in FIG. 11 by step 1001.

The touch audio signal generator 101 can furthermore be configured to comprise a touch force modulator 903. The touch force modulator 903 can be configured to determine a touch audio signal dependent on the pressure or force applied to the touch input module 11 as evaluated by the force determiner 901. In some embodiments the touch force modulator 903 is configured to modulate the amplitude of the touch audio pseudo-audio signal. Thus a first pressure or force of 50% of the full scale strength can be configured to generate by the touch force modulator a half scale sine wave such as a 16 bit half scale sine wave at 300 Hz. This audio signal would there be mixed to the uplink signal as described herein. Whereas a touch event pressed at the maximum strength that can be determined by the force determiner 901 can when received by the touch force modulator 903 can generate a full scale sine wave such as for example a 16 bit full scale sine wave at 300 Hz which is then mixed to the uplink signal by the audio mixer 105.

The operation of determining a touch audio signal dependent on the pressure or force experienced by the touch input module 11 is shown in FIG. 11 by step 1003 although as shown in the embodiments described with respect to FIGS. 10 and 11 the touch force modulator 903 is configured to modulate the amplitude of the output signal based on the touch force it would be understood that in some embodiments the frequency, or duty cycle of the output signal is modulated dependent on the touch force.

Furthermore it would be understood that any suitable relationship linear, non-linear, proportional, inversely proportional, monotonic or otherwise between the force/pressure and modulation can be implemented by the touch force modulator 903. In some embodiments a look up table rather than a mathematical determination can be implemented to determine the output with respect to the force/pressure and modulation relationship.

Figure 12:
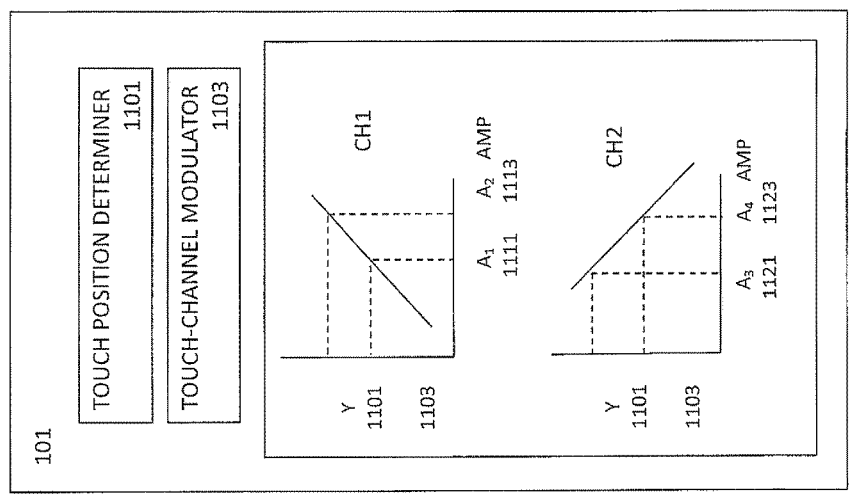
FIG. 12 shows schematically a touch-audio signal generator as shown in FIG. 2 according to some multichannel touch modulation embodiments.
Figure 12:
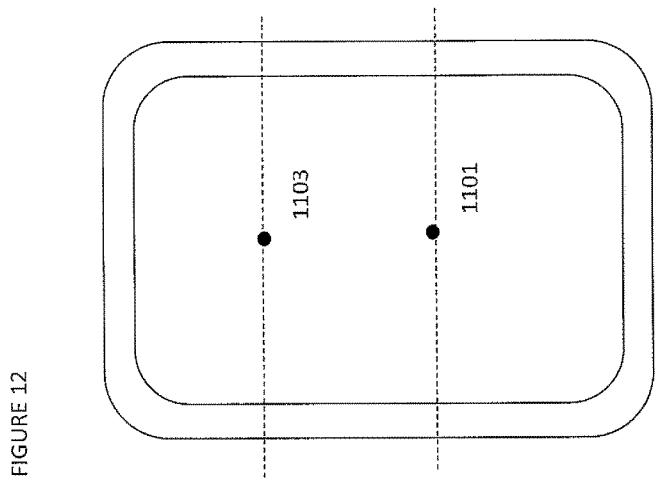

With respect to FIG. 12 an example multichannel operation of the touch-audio signal generator is shown according to some embodiments. Furthermore with respect to FIG. 13 the multichannel operation of the modulator is described.

In some embodiments the touch audio signal generator 101 comprises a touch position determiner 1101. The touch position determiner as shown in FIG. 12 determines the Y axis touch point displacement however it would be understood that in some embodiments the position determiner can determine the X axis touch point displacement or location of multiple points of contact as a combined X and Y axis position. The touch position determiner 1101 can be configured to output the position to the touch channel modulator 1103.

Figure 13:
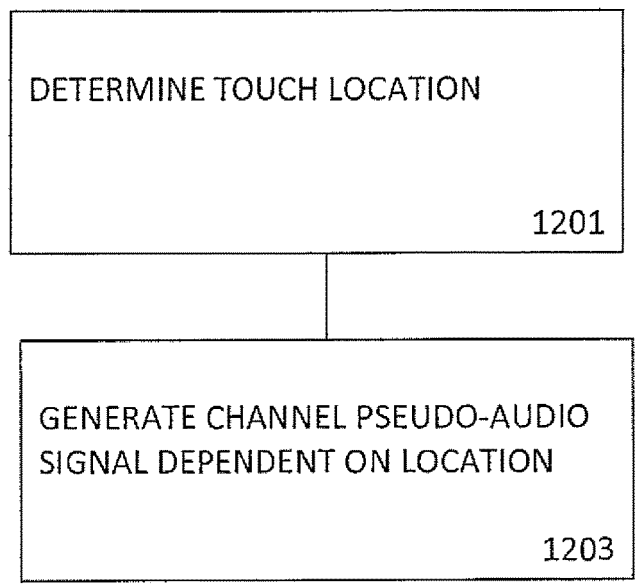
FIG. 13 shows a flow-diagram of the operation of the touch-audio signal generator as shown in FIG. 12 according to some embodiments.

The operation of determining the touch location is shown in FIG. 13 by step 1201.

In some embodiments the touch audio signal generator 101 comprises a touch channel modulator 1103. The touch channel modulator is configured to output multichannel audio signals, for example a stereo or two channel audio signal such that when the combined channel audio signals are encoded, transmitted, received decoded and passed to be output by the audio display at the receiver end the user can determine relatively where on the touch input module the pressure was applied or determined to have been applied.

The touch channel modulator 1103 as shown in FIG. 12 is configured to generate a first channel CH1 and a second channel CH2 audio signal and further to modulate the amplitude of the channel output in such a way that the amplitude increases for one channel as the Y displacement increases and the amplitude for the second channel decreases as the Y displacement increases. This for example is shown in FIG. 12 as the first channel audio signal CH1 is a lesser first amplitude $A_1$ 1111 when a first Y axis touch position displacement 1103 is determined and a greater second amplitude $A_2$ 1113 when a second Y axis touch position displacement 1101 is determined whereas the second channel CH2 is a greater amplitude $A_4$ 1123 when the first Y axis touch position displacement 1103 is determined and a lesser amplitude value $A_3$ 1121 when a second Y axis touch position displacement 1101 is determine.

Although in such embodiments the amplitude is shown being modulated dependent on the position it would be understood that in some embodiments the frequency can be modulated. Furthermore although two channels are described in these embodiments more than two channels can be implemented in some embodiments for example where the audio display has more than two actuators. Furthermore it would be understood that the relationships can be any suitable differential relationships.

The operation of generating the channel pseudo-audio signal dependent on location is shown in FIG. 13 by step 1203.

Furthermore in some embodiments the touch input module can be configured to generate a specified pseudo-audio signal dependent on a determined touch gesture or event. For example the touch input module 11 can in some embodiments be configured to determine a specific gesture, which may be single or multi-touch and generate a pseudo-audio signal to be passed to a further apparatus to be processed and in some embodiments 'displayed' or output on the further apparatus audio display. For example the touch input module 11 can in some embodiments be configure to determine a sweep, pinch zoom, circle or other suitable gesture and output a pseudo-audio signal dependent on the gesture and any suitable characteristics of the gesture. In some embodiments thus the touch input module 11 can determine that a circling motion is being made on the touch module and output an amplitude dependent on the radius of the circle being 'drawn' and a frequency dependent on the speed at which the circle is being drawn.

In some embodiments the apparatus can define gestures and further define what haptic signal or pseudo audio or audio signal the determination of the gesture can trigger. In other word the apparatus can be configured to record gestures and associate audio or pseudo audio signals and/or files with the gesture.

In some embodiments the detected or determined gesture can be the length of contact of the touch on the touch input module, which can generate a pseudo-audio signal which when output on the tactile user output apparatus can generate a similar length vibration. In such embodiments the touch on the touch input module can therefore be a dot, or dash signal input, such as a Morse coded signal which is output as a similar Morse coded signal on the audio display. In some embodiments the apparatus receiving the Morse coded signal is configured to decode the signal and provide a visual representation of the Morse code taps in the form of plain text.

In the examples described above the touch audio signal generator has generated a sinusoidal or substantially sinusoidal signal. It would be understood that in some embodiments any suitable waveform can be used as a base pseudo-audio waveform. For example in some embodiments there can be defined a set of predefined signals which the touch audio signal generator can read from memory. These read waveforms can further be modified dependent on the touch characteristics. For example the waveform can be amplified by a gain factor dependent on the touch characteristic or be pitch shifted dependent on the touch characteristic.

In some embodiments the output of a force sensor can be used to change the amplitude or pitch of the transmitted signal.

In some embodiments the apparatus can receive or download any suitable base pseudo-audio waveform.

It would be understood that in some embodiments that the waveform can be any suitable mix of multiple waves.

Furthermore in some embodiments the waveform can be a suitable defined audio signal that is changed based on the user actions. For example pitch shifting can be employed to adjust the frequency for the predefined audio signal. Furthermore in some embodiments the defined audio signal can be amplified if the screen is touched from the top part and attenuated if the screen is touched from the bottom part.

In some embodiments a VoIP phone call (wideband audio preferred) is established. It would be understood that in some other embodiments any suitable communication can be made between the tactile user input apparatus and the tactile user output apparatus. In some embodiments the tactile user input apparatus can be configured to use a VoIP communication protocol wherein meta information or metadata associated with the audio signal is communicated with the audio signal.

In some embodiments the metadata or meta information comprises information or indication on the coordinates of the touch (hover or contact touch) on the touch input at the tactile user input apparatus.

Thus for example the user of a first apparatus presses the touch screen at a first point C defined by co-ordinates $C_x, C_y$. Furthermore the user (which can in some embodiments be the same user) can be configured in these embodiments to press/touch a further or second apparatus at a second point C2 defined as $C2_x, C2_y$, then the first apparatus can be configured to generate a tactile event (for example a tactile signal frequency, e.g. 250 Hz, and fixed amplitude, e.g. 16-bit full scale sine wave, to be mixed to the uplink audio signal for the first apparatus.

The user of the further apparatus (which for example in some embodiments is a tactile audio display apparatus) holding their hand on the further apparatus display can be configured to receive the tactile event indicator/message/signal and the further apparatus can output the tactile signal which can be configured to be felt as the touch event signal haptic feedback.

In some embodiment the user of the first apparatus can move the point of touch to a third point D ($D_x, D_y$). In some embodiments unless the user of the further apparatus moves the touch to a corresponding fourth point D2 ($D2_x, D2_y$), then there is no additional generated event.

In some embodiments the tactile event can be passed more than one way, for example in some embodiments when it is determined that both apparatus displays are pressed at the same time at the same or corresponding coordinates, the touch event is generated and output to both apparatus uplink signals. In some embodiments more than two apparatus can communicate in such a manner where matching touch determinations can be configured to generate a suitable tactile event in the audio display.

In some embodiments the apparatus can be configured to send the haptic/tactile signal on the uplink without a corresponding further matching apparatus. For example the localized haptics the user of the first apparatus will be output on the uplink and can be felt by the user of the further apparatus no matter where the use of the further device touches the display.

In some embodiments the outputting of coordinates as metadata from the first apparatus to the user of the further apparatus can cause the further apparatus to generate on a visual display an image representing the co-ordinates. For example in some embodiments the visual display element can be an image of a linger 'touching' the display at the coordinates sent from the apparatus. In such embodiments the visual display element, for example the image of the 'finger' can indicate to the user of the further apparatus where to touch the further apparatus audio display to receive or stimulate haptic feedback. It would be understood that in some embodiments any suitable image can be used to represent the co-ordinates, for example a stored or downloaded image or icon representing the user of the first apparatus.

In some embodiments the feedback, such as the tactile feedback, can be pre-loaded or generated based on some metadata information.

In some embodiments the background image can also be determined or changed by the user of the further apparatus or can be provided as part of the metadata. For example as a JPEG image sent as metadata from the first to further apparatus.

In some embodiments the metadata sent between apparatus could also include other information concerning the sending apparatus. For example in some embodiments the metadata can comprise at least one of: the status of the vibra component and parameters associated to it in the sending apparatus; the status of any sensors (for example the proximity detector, ambient light sensor, magnetometer, accelerometer) and parameters associated to the sensor in the sending apparatus, the status of the RF receivers and RF transmitters and parameters associated to the radio frequency receiver and/or transmitter in the sending apparatus. In some embodiments this information can be used as an input for generating a suitable tactile event output, for example by defining or adjusting the tactile feedback signal. In some embodiments the metadata can be configured to have a reference (for example an URL or some ID) to a suitable defined audio signal. In some embodiments this reference can be used within the apparatus to provide the tactile signal. In some other embodiments the defined audio signal, which provides the tactile signal, is not stored in the apparatus, but can be found from or in the "cloud".

Furthermore although the examples described herein describe the 'touching' or pressing the display at certain points it would be understood the moving the finger or touch object on the display can also be configured to change the output. In other words the signal is adjusted 'on the fly' when the finger or touch object is moved.

In some embodiments a touch input may be replaced by or added to by any suitable input. For example the input can comprise an accelerometer input (the way the apparatus is rotated can be used as an input to adjust the signal), a magnetometer input (the direction the apparatus is pointing can be used as an input), a proximity detector input (the information about something being close to the surface of the apparatus can be used as an input), an ambient light sensor input (the lightness of the surrounding space can be used as an input), and a GPS signal input (the location, speed or acceleration of the apparatus can be used as an input). Furthermore the force sensor can in some embodiments be used to detect finger press on the screen.

The apparatus can in some embodiments therefore offer a user interface enabling the user can select from list of possible predefined audio signals to be played to the uplink. The selection can be offered for example in some embodiments as a group of buttons, but it would be understood that in some other embodiments other UI elements could be implemented.

It would be understood that in some embodiments the examples described herein can be implemented on apparatus which do not comprise a tactile audio display. For example the examples described herein can be implemented where the further apparatus (the receiving apparatus) is a tactile audio display apparatus whether the first apparatus (the sending apparatus) is a tactile audio display device or not. However it would be understood that where the receiving apparatus is not a tactile audio display apparatus, then the tactile feedback received will generate audible signals which could be annoying.

In some embodiments the sending apparatus can be configured to recognise whether the receiving apparatus is a tactile audio display apparatus (or not). For example in some embodiments where the communication between apparatus is a proprietary VoIP communication protocol this information can be sent as metadata. Furthermore in some embodiments, for example in a circuit switched communication (and furthermore applicable to VoIP communications) information about the tactile audio display apparatus could be inaudibly "watermarked" into the speech signal (or other audio signal) that can then be recognized by the receiving apparatus. This watermarking and its recognition would not cause any problems with non-tactile audio display apparatus. In some embodiments the second apparatus can be configured to 'filter out' the tactile feedback component or be configured to route the tactile feedback component to a vibra to provide some feedback.

In some such embodiments where the sending apparatus determines the receiving apparatus is a tactile audio display apparatus, then the sending apparatus can decide whether to send the tactile feedback to the further apparatus.

In some embodiments the receiving apparatus can be configured to switch off or on the tactile or haptic event generation such that the received tactile signal is not used to generate motion in the tactile audio display. For example it could be annoying when the user receives tactile feedback during a call especially when using it in hand-portable mode.

Thus for example in some embodiments the determination of implementing or generating the haptic/tactile output can be automatically determined, semi-automatically determined or manually configured.

In some embodiments the further apparatus can comprise a tactile output determiner configured to stop or halt the generation of haptic signals when audio is routed to the earpiece transducer or the tactile audio display is configured to operate in an earpiece mode. Furthermore the tactile output determiner can be configured to stop or halt the generation of haptic signals when the proximity detector and/or ambient light sensor and/or camera and/or touch sensor determines an object (for example an ear or a cheek) near the display.

The tactile output determiner can be configured in some embodiments to ignore or pass the metadata dependent on whether the tactile output is to be generated. Furthermore in some embodiments the tactile output determiner can be configured to control passing or blocking of the haptic signal where the haptic signal is received as a separate audio path than the phone call or received audio signal.

In some embodiments where the haptic feedback signal is received as part of the combined audio signal (for example an audio signal from phone call with the pseudo audio signal representing the tactile event) then signal processing can be employed to separate/filter the pseudo-audio signal. For example in some embodiments the tactile output determiner can be configured to filter out the frequencies where tactile feedback is strongest. In some embodiments the tactile output determiner can be configured to employ noise cancellation or comparable to tune the pseudo-audio signal representing the haptic feedback away.

It shall be appreciated that the term user equipment is intended to cover any suitable type of wireless user equipment, such as mobile telephones, portable data processing devices or portable web browsers. Furthermore, it will be understood that the term acoustic sound channels is intended to cover sound outlets, channels and cavities, and that such sound channels may be formed integrally with the transducer, or as part of the mechanical integration of the transducer with the device.

In general, the design of various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The design of embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory used in the design of embodiments of the application may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be designed by various components such as integrated circuit modules.

As used in this application, the term 'circuitry' refers to all of the following:

(a) hardware-only circuit implementations (such as implementations in only analog and/or digital circuitry) and (b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims.

However, all such and similar modifications of the teachings of this invention will still fall within the scope of this invention as defined in the appended claims.

The invention claimed is:

1. An apparatus comprising:
   at least one processor; and
   at least one memory including computer code for one or more programs, the at least one memory and the computer code configured to with the at least one processor cause the apparatus to at least:
   determine a touch input characteristic at a near-end device;
   generate a pseudo-audio signal;
   mix the pseudo-audio signal at the near-end device during an active communication; and
   transmit the pseudo-audio signal from the near-end device to one or more separate apparatus wherein the one or more separate apparatus at least partially forms a communications system during the active communication with the near-end device, wherein the pseudo-audio signal by the near-end device is configured to generate a tactile output.

2. The apparatus of claim 1 further comprising an audio signal mixer, wherein the audio signal mixer is configured to receive an audio signal from an audio signal source and the pseudo-audio signal from a touch audio signal generator and mix these signals to form a combined audio signal.

3. The apparatus of claim 2 wherein the at least one memory including computer code for one or more programs, the at least one memory and the computer code are configured to with the at least one processor to cause the apparatus to pass the combined audio signal to an encoder.

4. The apparatus of claim 2 wherein the audio signal mixer is configured to mix the pseudo-audio signal from the touch audio signal generator where there is no active audio input.

5. The apparatus of claim 2 wherein the audio signal mixer is configured to receive more than one audio signal and/or more than one pseudo-audio signal.

6. The apparatus of claim 2 wherein the audio signal mixer is configured to receive more than one pseudo-audio signal from more than one tactile source.

7. The apparatus of claim 1 further comprising a frequency modulator configured to modulate a pseudo-audio signal output dependent on touch pressure or force, number of touch points or determinable input parameters or characteristics.

8. The apparatus as claimed in claim 1, wherein the determined input characteristic causes the apparatus to: determine a touch input; determine of the touch input characteristic; and generate a signal dependent on the determined touch input characteristic, wherein the signal is configured to generate the tactile output.

9. The apparatus as claimed in claim 1, wherein the determined touch input characteristic causes the apparatus to: determine a force/pressure of the touch input; determine a displacement of the touch input in a first direction relative to an edge of the touch input apparatus; determine a displacement of the touch input in a second direction substantially orthogonal to the first direction; determine a speed of the touch input; determine a co-ordinate of the touch input; determine a number of points of contact of the touch input; and determine a gesture from the touch input.

10. The apparatus as claimed in claim 1, wherein the determined input characteristic causes the apparatus to at least one of: determining a status of a vibra component; determining a vibra component parameter; determining a proximity detector parameter; determining an ambient light sensor parameter; determining a magnetometer parameter; determining an accelerometer parameter determining a GPS parameter; determining a status of the receiver; determining a status of a transmitter; determining a radio frequency receiver parameter; and determining a radio frequency transmitter parameter.

11. An apparatus comprising:
   at least one processor; and
   at least one memory including computer code for one or more programs, the at least one memory and the computer code configured to with the at least one processor cause the apparatus to at least:
   receiving a combined signal comprising a tactile signal and an audio signal, wherein the combined signal is provided during an active communication, wherein the combined signal is dependent on an input characteristic from a separate apparatus; and generating a tactile output dependent on the combined signal.

12. The apparatus as claimed in claim 11, wherein the receiving the combined signal comprises:
receiving the combined signal from memory;
receiving the combined signal from a further apparatus.

13. The apparatus as claimed in claim 11 wherein a decoder of the apparatus is configured to generate a signal dependent on the received combined signal from the separate apparatus.

14. The apparatus as claimed in claim 13 wherein the decoder is configured to output a combined signal to an audio display module.

15. The apparatus as claimed in claim 14 wherein the audio display module is configured to transduce the signal component to generate the tactile output.

16. The apparatus as claimed in claim 11 wherein an audio driver of the apparatus is configured to generate the tactile output.

17. The apparatus as claimed in claim 11, wherein the apparatus comprises an audio driver configured to control the audio display module to generate an audio output.

18. The apparatus as claimed in claim 11, wherein the combined signal comprises at least one of: an indicator for a vibra signal; a vibra signal frequency; a vibra signal amplitude; a vibra signal waveform definition; vibra signal waveform definition indicator; and at least one sine wave signal.

* * * * *

UNITED STATES PATENT AND TRADEMARK OFFICE
CERTIFICATE OF CORRECTION

| | |
|---|---|
| PATENT NO. | : 10,146,315 B2 |
| APPLICATION NO. | : 15/888460 |
| DATED | : December 4, 2018 |
| INVENTOR(S) | : Marko Tapani Yliaho and Thorsten Behles |

It is certified that error appears in the above-identified patent and that said Letters Patent is hereby corrected as shown below:

In the Claims

In Claim 8:
Column 24, Line 31, "of" should be deleted.

Signed and Sealed this
Nineteenth Day of February, 2019

Andrei Iancu
*Director of the United States Patent and Trademark Office*